Dec. 6, 1938.   J. S. STREICHER   2,139,529

PROCESS OF TREATING PALLADIUM

Filed Sept. 15, 1934   2 Sheets-Sheet 1

.062"×.006"
ORIGINAL DISC

.040"×.018"
50 L

.030"×.030"
75 L

.030"×.030"
145 L

.050"×.015"
ORIGINAL WASHER

.035"×.020"
75 L 1.38"×0.040"
103 L 0.82"×0.064"
150 L 0.65"×0.070"
200 L 0.41"×0.095"
250 L 0.35"×0.110"
300 L

INVENTOR.
Johann S. Streicher
BY Lotka & Kehlenbeck
ATTORNEYS.

Figure 4:
Figure 15:
Figure 16:
Figure 17:

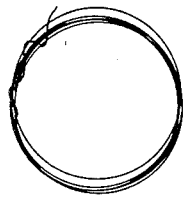
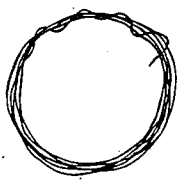
FIG. 18 — ORIGINAL WIRE
FIG. 19 — 4 L
FIG. 20 — 15 L
FIG. 21 — 22 L
FIG. 22 — 31 L
FIG. 23 — 105 L
FIG. 24 — ORIGINAL WIRE
FIG. 25 — 60 L
FIG. 26 — ORIGINAL FOIL
FIG. 27 — 50 L
INVENTOR.
Johann S. Streicher
BY Lotka & Kehlenbeck
ATTORNEYS.

Patented Dec. 6, 1938

2,139,529

UNITED STATES PATENT OFFICE 2,139,529

PROCESS OF TREATING PALLADIUM

Johann S. Streicher, Newark, N. J., assignor to The American Platinum Works, Newark, N. J., a corporation of New Jersey Application September 15, 1934, Serial No. 744,180

14 Claims. (Cl. 148—4)

My invention relates to a process of treating palladium for the purpose of giving it forms in which it will have material advantages over ordinary palladium. One of the important advantages of my invention is the efficiency which palladium treated or activated according to my method has in connection with catalytic processes. Another advantage is the production of palladium articles of a shape which lends itself readily to ornamental use. Other advantages will appear from the description following hereinafter.

The fact that palladium will absorb hydrogen is well-known, but prior to my invention no satisfactory results were obtained in processes involving the absorption of hydrogen by palladium, as the sorptive capacity appeared to vary within wide limits, in a very erratic way, for reasons which were unknown. By systematic investigation I have determined the conditions which govern the absorption of hydrogen by compact palladium and have thus been enabled to devise a process which produces activated compact palladium of definite, uniformly obtainable characteristics, by a novel procedure which can be carried out readily with great efficiency and in which the absorption of hydrogen by palladium may be performed at relatively low temperatures, such as room temperature or below. The raw material from which I prepare the improved activated palladium is preferably compact palladium, but I may also employ finely-divided palladium, provided it is brought into compact shape.

I have found that one of the conditions required for success is the absence of any film of gas, grease, or other deleterious substance on the surface of the palladium, which film would interfere with the proper absorption of hydrogen. Such film may either be removed by any suitable process, for instance treatment with acids (pickling), electrolytic degreasing (electrolytic pickling), or it may be destroyed by either anodic or thermic oxidation (the resulting minute layer of palladium oxide has no detrimental effect). After such cleaning treatment, the palladium is subjected to alternate charging and discharging with hydrogen, these charging and discharging operations being repeated a suitable number of times, as fully explained hereinafter. The charging operation may be performed, for instance, by exposing the metal to a current of hydrogen, or by an electrolytic process.

Palladium metal in the compact state and in any shape, when subjected to a treatment which destroys the gas or other harmful or poisoning layers covering the surface of the metal, has the ability to react chemically with hydrogen; gaseous hydrogen (hydrogen in the molecular state) reacts with the metal as well as hydrogen in the nascent state (atomic hydrogen); such metal absorbs hydrogen very readily at room temperature, but still better below room temperature. Hard palladium (obtained by cold working), if given a preliminary activating treatment according to my invention, absorbs gaseous hydrogen even more quickly than when in the soft state (annealed and recrystallized); but in either the hard or the soft state, such palladium will always absorb gaseous hydrogen very readily and quickly; there is no complication of the process of absorption, no "extremely erratic behavior" of the metal such as so often reported in the literature releating to the interaction of palladium and hydrogen.

Palladium metal with a chemically purified or cleaned surface, when treated with hydrogen at room temperature or below room temperature, in all probability forms a chemical compound; through tests, repeated many times, it has been found that the absorbed hydrogen is always in a proportion to palladium which corresponds almost exactly to the formula $Pd_3H_2$. This hydride or hydride mixture has a dissociation pressure of 1 atmosphere around 60° C.; as the temperature is reduced progressively below 60° C., more and more hydrogen is absorbed if the hydrogen atmosphere is maintained at the pressure of 1 atmosphere; at temperatures below 0° C. such amounts of hydrogen are absorbed that palladium and hydrogen seem to combine in proportions approaching the formula $PdH$. Compact palladium charged with hydrogen at room temperature has a volume exceeding that of the original metal by 15%. Charging the metal with hydrogen at room temperature changes the color from light grey to dark grey. Heating the metal charged with hydrogen to temperatures above 60° C., preferably above 200° C., expels the hydrogen from the metal and causes the latter to contract; if this heating is carried out in an open muffle, the dissociated hydrogen mixes with air; this mixture is finally ignited through the catalytic action of the palladium metal; the hydrogen-air mixture is burnt with a great flame. When the metal is for the first time charged with hydrogen at room temperature and then freed of such hydrogen either by dissociating off the hydrogen or by burning it off, the contraction of the metal during the expulsion of the hydrogen is such that the metal resumes its original volume. But repeated hydrogen chargings and dischargings at temperatures below 70° C., especially at room temperature or below change the metal: The metal never again contracts to the volume it had originally; the initially compact structure of the metal is slowly transformed into a slightly open and slightly loose structure; in this way the inner surface is considerably increased; but, and this is quite remarkable, the area of the outside surface is steadily reduced; according to a series of measurements, this external surface contraction attains values of about 75% and more. During this process of repeated charging and discharging the palladium metal loses its original surface brilliancy; the bright surface becomes rather dull; the color of the metal changes to a very light grey. The chemical literature very often states that repeated absorption of hydrogen transforms palladium into a friable, brittle and sometimes powdery state, and that the metal, after such repeated absorption of hydrogen, is not useful for any purpose unless it is melted again. I have found that when treated according to my invention, compact palladium can be subjected at relatively low temperatures many hundreds of times to the operation of charging with hydrogen and then freeing it of hydrogen (discharging the hydrogen), without changing its metallic character; the metal becomes gradually harder through this process of repeated sorption but always preserves its compact character; since its structure is slightly opened or loosened by the repeated gas sorption, the metal is finally transformed into a very active state. This increase in activity is manifested most clearly in the process of the repeated sorption of the metal: When compact palladium is for the first time charged with hydrogen at or below room temperature, a palladium-hydrogen compound results which is exceedingly stable; it can be kept in the open air for days and weeks without losing hydrogen; but when the metal is charged with hydrogen and again freed of hydrogen, about twenty times, the metal is transformed into such a state of activity that, in the charged state, the connection or combination of the hydrogen with the metal is very unstable; the instability of the palladium-hydrogen compounds increases with the number of sorptions; and with 70 to 100 sorptions the metal is activated to such a high degree that the palladium-hydrogen compounds have become pyrophoric and ignite instantly when exposed to air. But looking at all these changes of the palladium metal, effected by the repeated sorption and discharges of hydrogen, from a view-point which takes into consideration the totality of the complex phenomena disclosed by my researches, a new way of producing activated palladium in an improved form becomes available. The physical changes of the metal described above—expansion and subsequent contraction of the metal—are the result of a chemical process; hydrides, mixtures of hydrides, or solid solutions of these hydrides in the metal are formed. Whenever a chemical reaction takes place, the substance is completely subdivided to the point of the chemical atom. Palladium hydrides have a metallic character; this is the reason that the formation of such hydrides does not destroy, externally, the form of the substance; what is destroyed by charging the metal with hydrogen is its structure; through the repeated sorption and discharging (expulsion of hydrogen), the crystal-structure of the metal is gradually transformed into a substance which is still palladium, chemically, and is still (which is quite exceptional) in a compact state, but it is very finely subdivided, it is amorphous; to use the language of the mineralogist, it represents a pseudomorph after the palladium hydrides. Palladium-metal treated several times by hydrogen-charging and discharging, takes the characteristic form of the palladium hydrides after approximately twenty hydrogen sorptions. Palladium in this pseudomorphic and amorphous state has the same general properties as any other amorphous substance; it is very unstable; it has the tendency (through its surface tension, similar to all substances in the liquid or, as in this case, in the pseudo-liquid state) to contract to a body having the smallest possible area or surface for a given volume of this now porous body, that is to say, to the spherical form. The pseudomorphic palladium is in its most unstable state at the moment when the charged metal is freed of hydrogen by dissociation or burning off; at this instant the pseudomorphic palladium is practically in its nascent state; in this nascent state the very minute particles of the metal follow the inward attractive forces (surface tension). This is the real cause for the deformation of the palladium metal through repeated sorptions of hydrogen. In view of this, it will be understood why repeated sorptions of hydrogen will "destroy" palladium when this metal is treated in shapes, such as very thin wires or foils, where one or two dimensions are particularly great. When palladium of such shapes is treated, the conflict between the forces tending to preserve the thinness of the metal and those which tend to contract the metal to the spherical form will cause the original shape of the metal to be broken up, cracks will develop, and the metal finally becomes unserviceable. But by applying the hydrogen-sorption treatment to shapes of palladium such as referred to below, these conflicting forces can be directed to transform the palladium metal, through repeated sorptions of hydrogen, into new and useful shapes, such shapes as could be attained only with the greatest difficulties by mechanical processes. If the metal to be used for repeated sorption is shaped mechanically into such bodies as little discs, washers, cubes, parallelograms, etc., where the three dimensions—height, length and width—are not out of proportion, as in the above cases, but, on the contrary, proportionally very close together, and if such metal is repeatedly subjected to charging and discharging with hydrogen, the process of converting the pseudomorphic metal to the spherical shape which is its natural form, is completed with the least number of sorptions. The number of sorptions necessary to form a sphere will be a minimum when the virgin metal is shaped into cubes or into cylinders the height of which is equal to their diameter. The number of sorptions required to form a spherical body increases, the more the dimensions of the virgin metal deviate from such regular shapes. By applying this method of preliminary shaping to compact palladium, absolutely ideal and very stable rounded or spherical bodies of the pseudomorphic metal are obtained in a very simple way.

During the sorption of hydrogen heat is evolved; the sorption of one mol (2 grams) of hydrogen evolves 9.4 kilogramcalories. In view of the exothermic character of the sorption process, I have found that palladium will sorb hydrogen most quickly if the metal is cooled during this process, the best results being obtained when during sorption the metal is kept at temperatures below 25° C., and preferably between 0 to 25° C. If the metal is not cooled during the treatment with hydrogen, the temperature of the metal rises very quickly to 140° C. with the beginning of the hydrogen sorption, and as a result the sorption progresses only to the extent that the heat developed by the formation of the hydrides is dissipated or radiated to the surrounding medium. But when as proposed in the prior art the metal is treated with hydrogen at such high temperatures as 70 to 100° C. and even above, the resistance to absorption may under such circumstances be increased to such a degree that the hydrogen is not absorbed at all, particularly if traces of water vapor are present. In contradistinction to these prior processes employing temperatures of 70° C. and above, I conduct the operation of charging palladium with hydrogen, at temperatures below 70° C.

Palladium bodies activated by repeated alternate chargings (loadings) and dischargings with hydrogen will absorb hydrogen instantly in a tube cooled with water. For this reason I prefer to use cooling during the production of these palladium bodies which are activated and simultaneously given a spherical or other rounded or regular shape.

Figure 1:
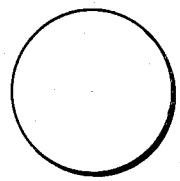
Figure 3:
Figure 5:
Figure 7:
Figure 2:
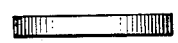
Figure 6:
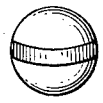
Figure 8:
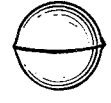
Figure 9:
Figure 11:
Figure 10:
Figure 12:
Figure 13:
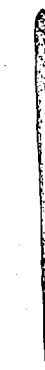
Figure 14:

A few examples of the various ways in which my invention may be preformed will now be described in detail with reference to the accompanying drawings in which Figs. 1 to 8 illustrate one example of my invention, Fig. 1 being a plan view and Fig. 2 a side elevation of the original disc employed in this form of my invention; Figs. 3 and 4 show, in plan view and side elevation respectively, the appearance of this disc after 50 loadings and discharges with hydrogen; Figs. 5 and 6 show, in plan view and side elevation respectively, the material as it appears after 75 hydrogen loadings and discharges; Figs. 7 and 8 show, in plan view and side elevation respectively, the appearance of the material after 145 hydrogen loadings and discharges; Figs. 9 to 12 illustrate a second example of my invention, Fig. 9 being a plan view and Fig. 10 a side elevation of the original washer employed in this example, while Fig. 11 is a plan view and Fig. 12 a side elevation showing the ring into which such washer is transformed by 75 hydrogen loadings and discharges; Figs. 13 to 17 illustrate a third example of my invention, in which a wire is subjected repeatedly to hydrogen loadings and discharges; Figs. 13 to 17 show the appearance of such wire after such loadings and discharges have been repeated 103, 150, 200, 250 and 300 times respectively; Figs. 18 to 23 illustrate a fourth example of my invention, Fig. 18 showing a flat coil of wire in its original condition, while Figs. 19 to 23 show the appearance of such wire after 4, 15, 22, 31, and 105 treatments respectively, each treatment consisting of a hydrogen loading and discharge; Fig. 24 shows a length of untreated palladium wire coiled into a ball, according to a fifth example of my invention, and Fig. 25 shows the appearance of such ball after 60 hydrogen loadings and discharges; Fig. 26 shows a square piece of untreated palladium foil, according to a sixth example of my invention, and Fig. 27 shows the appearance of such piece after 50 hydrogen loadings and discharges.

Wherever the letter L occurs in the drawings in connection with a numeral (for instance, 50L), it is to be understood as an abbreviation for "loadings and discharges".

*Example 1*

Sheet palladium is rolled to a thickness of .006"; from this sheet 515 grams are punched to discs (Figs. 1 and 2) with a diameter of .062". These 515 grams of discs have a bulk volume of 85 cubic centimeters and thus have a bulk weight of 6 grams per cubic centimeter. These discs are put into a quartz boat and heated in an open muffle to a temperature of from 500 to 800° C. for 15 to 30 minutes. By this treatment, grease, adhering to the metal from the mechanical processes, is burnt off and the metal is slightly oxidized upon its surface. This metal is now treated with hydrogen in a water-cooled tube; the hydrogen is most conveniently taken from a regular hydrogen-cylinder, either directly or after carrying it through concentrated sulfuric acid or any other drying agent. The oxidized palladium discs start to sorb the (molecular) hydrogen instantly; in 15 to 20 minutes all the metal is charged with hydrogen to such a degree that 100 grams of metal contain about 600 milligrams of hydrogen.

At this point, I prefer to stop the sorption treatment, since continuing this treatment will effect but a comparatively slight increase in the amount of hydrogen sorbed.

For instance, if the metal is constantly cooled to 25° C., the metal will naturally sorb more hydrogen when treated with hydrogen for a longer time. The amounts of hydrogen sorbed are:

| | Milligrams hydrogen per 100 grams palladium |
|---|---|
| For 1 hour treatment | 625 |
| For 3 hours' treatment | 656 |
| For 8 hours' treatment | 659 |

After three hours' treatment the saturation point is nearly attained. On an average 3.09 grams of hydrogen are sorbed by the 515 grams of palladium (34 liters of hydrogen at the pressure of 1 atmosphere and 0° C.).

In the practical performance of my process, as soon as the sorption has proceeded up to about 600 milligrams hydrogen per 100 grams palladium the hydrogen in the tube is quickly displaced by nitrogen; the boat with the charged metal is taken from the tube. Charging the metal with hydrogen changes its color from light gray to dark gray. The hydrogen is then discharged from the metal by putting the quartz boat with the charged metal into an open muffle which is heated from 300 to 600° C. The hydrogen is thus caused to dissociate from the metal and mixes with air; through the catalytic action of the palladium this air-hydrogen mixture is soon ignited; the hydrogen is consumed quickly. The entire discharging operation takes about 5 minutes. These operations of charging and discharging with hydrogen are repeated a suitable number of times. After about 20 such chargings and dischargings with hydrogen, the palladium discs lose their original metallic lustre and assume a dull very light gray color; the sharp edges of the treated discs have by that time become rounded. After 50 such chargings and dischargings, the discs have assumed the shape of small lenses (Figs. 3 and 4), and the bulk weight has increased to 6.6 grams per cubic centimeter, the bulk volume having shrunk from the original 85 cubic centimeters to 76 cubic centimeters. After 75 chargings and dischargings the discs have been converted from their original cylindrical shape into balls or spheres with a diameter of .032" (Figs. 5 and 6). The spherical shape of these balls becomes more perfect as more loadings are employed, Figs. 7 and 8 showing the effect after 145 loadings and discharges. These palladium balls (pseudomorphic metal) have an outer surface about 46% smaller than that of the original discs or cylinders.

*Example 2*

Sheet palladium is rolled to the thickness of .015"; from this sheet I punch centrally perforated discs (washers or hollow cylinders, Figs. 9 and 10) having an outside-diameter of 0.050"; an inside-diameter of 0.036"; a wall thickness (measured radially) of 0.007". The metal is treated as in Example 1. After 75 chargings and dischargings with hydrogen the little hollow metal cylinders are completely transformed into metal rings (Figs. 11 and 12); the sharp edges are rounded, inside as well as outside; the body of the ring is .022" thick; the opening of the ring has shrunk to .003" from the original .036".

*Example 3*

Palladium wire .016" (.4 millimeter) in diameter is cut into pieces 300 millimeters long; those wire pieces are slightly pickled with warm diluted nitric acid; afterwards the acid is carefully washed off with distilled water; the wires are dried in the drying oven at 50 to 100° C. The repeated charging and discharging of these wires with hydrogen is performed according to the method outlined in Example 1. The wires become gradually shorter and thicker; very soon the sharp edges at both ends become rounded. The ratio between diameter and length of these wires is originally as 1:754; through repeated charging with hydrogen and discharging this ratio changes as follows:

Charged 0 times____ 1:754
Charged 10 times____ 1:580
Charged 20 times____ 1:420
Charged 30 times____ 1:298
Charged 40 times____ 1:219
Charged 60 times____ 1:110
Charged 100 times____ 1:46
Charged 150 times____ 1:18
Charged 200 times____ 1:9    } see Figs. 13 to 17
Charged 300 times____ 1:3

The outside surface of these wires is reduced from 375 square millimeters to 93 square millimeters by 300 charging and discharging treatments; the volume of such a wire body is increased from 37.3 cubic centimeters to 58 cubic centimeters. After 300 charges the metal pieces are only 9 millimeters long; (the original wires had a length of 300 millimeters); but they are now 2.9 millimeters thick (originally 0.4 millimeter); the ends of the wires are now rounded; the tendency to assume a spherical shape is evident. The ratio between height and width in the metal cylinders of Example 1 was originally as 1:10; this ratio is then reduced to the value 1:1 with 75 chargings. Comparison of Examples 1 and 2 (where 75 alternate chargings and dischargings with hydrogen have been described as resulting in the thorough rounding of the originally sharp edges) with Example 3 (where 300 such chargings and dischargings have been indicated) shows clearly that the number of such alternate treatments required to produce similar results, is the greater, the more extremely shaped the original metal is, either in one or in two directions.

*Example 4*

Palladium metal is drawn to wire .005" thick. This wire is cut into pieces one meter long. These thin wire pieces are wound around a wooden cylinder 30 millimeters in diameter; the flat coils so formed are kept together by winding one end of the wire several times around the coil (Fig. 18). These coils are slipped off the wooden core and pickled in hot diluted nitric acid; they are then washed with distilled water and carefully dried. They are then treated with hydrogen in a tube cooled with water; the wires charged with hydrogen are discharged in an open muffle heated from 300 to 600° C. This process repeated many times changes the wire coils in such a way that the wires become gradually shorter and thicker; this increase in thickness causes at the same time a considerable shrinkage of the coils; the diameter of these coils becomes smaller and smaller with repeated sorptions, as shown by Figs. 19 to 23 and by the following table:

| Number of sorptions | Inside diameter of coils |
|---|---|
|  | *Millimeters* |
| 0 | 30 |
| 22 | 20 (Fig. 21) |
| 105 | 7 (Fig. 23) |

A few more sorptions will cause the coils to coalesce into a spherical form; the wire layers can still be distinguished, but the opening of the coils has completely vanished. This example shows that metal which is originally extremely shaped in one or two dimensions (for instance, pieces of wire the length of which is very considerable relatively to their thickness) can also be quickly transformed into the pseudomorphic and active palladium (that is, by a relatively small number of sorptions and discharges) if previous to the hydrogen charging and discharging treatment such metal is brought into more compact shape (for instance by forming it into coils as just set forth).

*Example 5*

Palladium wires .005" thick, 1 meter long, are wound or coiled into balls (Fig. 24). These wire balls measure .400" in diameter. They are oxidized superficially in the open muffle at 400 to 800° C. and then repeatedly charged with hydrogen and discharged in the manner described above. With the 60th sorption (Fig. 25) they shrink in diameter to about .200"; the thickness of the wire has increased, at this stage, from .005 to .007". The metal is hard, but still ductile. Pseudomorphic palladium thus produced from thin wires has an extraordinary activity, especially when these thin wires are originally drawn with a reduction of more than 70%, preferably above 85%.

*Example 6*

Palladium metal, rolled into foils, exhibits very wide differences between length, width, and thickness; the ratio of the three dimensions of a foil or strip having a width of 1", a length of 11", and a thickness of .0005" is as 2000:22000:1. On account of the wide discrepancy between its three dimensions, such a foil or strip would not yield satisfactory results when subjected to repeated charging and discharging with hydrogen.

However, in a manner similar in principle to that described in Examples 4 and 5, it is possible to use palladium foils for the production of the pseudomorphic palladium. The foils are cut into small pieces, for instance ¼" x ¼" x .0005" (Fig. 26); in this way the dimensions of the foil pieces are reduced to the ratio of 500 x 500 x 1; with about 50 to 60 hydrogen sorptions these foil pieces are transformed into very regularly wrinkled palladium-flakes (Fig. 27). These pseudomorphic palladium-flakes are very hard; as they are very light, and their weight per volume is extraordinarily small (0.35 gram per cubic centimeter). These flakes constitute a very active material, especially when they are made from palladium foils which have been rolled with a reduction of more than 70%, preferably above 85%.

It will be understood that the six examples given above are merely illustrative of my invention, and that I do not desire to restrict myself to these particular forms of the material and of the treatment. With respect to the subdivision of the material into small bodies, other methods than those described above may be employed, for instance the material when in the form of wire, may be cut into short pieces similar to pins if the wire is thin, or more or less disc-shaped if the wire is relatively thick. Instead of forming the wire into flat coils as in Example 4, or into balls as in Example 5, I may form it into open coils, either helical or spiral.

As mentioned at the beginning of this specification, it is also possible to use an electrolytic process for the repeated sorptions with hydrogen. In this case, compact palladium is used as a cathode in the electrolytic cell, while the anode may consist of platinum or palladium; the electrolyte preferably consists of dilute sulfuric acid (a 1 to 2 molar solution). With a current density of from 40 to 100 milliamperes per square centimeter, the palladium cathode will, within a few minutes, become saturated with (atomic) hydrogen to the same degree as with molecular hydrogen. For the reasons mentioned above, this cell may be cooled. This very convenient method suggests that the electrolytic process might also be used for the discharging of the charged metal (expulsion of the sorbed hydrogen), by reversing the electrical connections so that such metal will form the anode of the cell. However, tests have shown that this electrolytic expulsion of the sorbed hydrogen from the charged metal does not produce the desired result of transforming the metal into the pseudomorphic state characterized above. Therefore, the active pseudomorphic state of the palladium, especially the spherical forms of this state, can be attained only when the metal charged with hydrogen by either the electrolytic method or the other method described, is discharged (freed of hydrogen) in such a way that the hydrogen is primarily dissociated and completely expelled from the metal; this dissociation and expulsion of hydrogen from the metal is most easily performed, as described above, by subjecting the metal charged with hydrogen, to a temperature above 60° C. preferably above 200° C.

I have described above now spherical and other rounded forms of the pseudomorphic palladium can be produced from the compact metal. It might be thought that the same method might also be used with palladium-sponge or palladium-black and similar non-compact palladium as the initial or raw material, by pressing these special forms of finely divided palladium into coherent bodies, for instance, tablets, and charging these tablets repeatedly with hydrogen in the manner set forth above. It has been found, however, that it is not possible to produce from such non-compact forms of palladium (unless they are first brought into the compact state as referred to below) the regularly shaped coherent pseudomorphic palladium referred to above.

These tests show that the method to produce the rounded or spherical forms of the pseudomorphic palladium can be applied successfully only to such metal which is in the compact state and which has the well-known metal structure; such a compact state of the metal may be attained either by fusion or by the metallizing process (by pressing sponge, and then heating, sintering, and forging (swaging) the same, etc.).

Pure palladium as well as the different kinds of commercial palladium may be used. Minor impurities such as frequently accompany palladium, (for instance copper, silver, gold, and metals of the platinum group) do not interfere with the absorption of hydrogen and with the process of shaping the metal as described, especially if these impurities consist of metals belonging to the platinum group.

The active and pseudomorphic palladium metal and its rounded or spherical bodies obtained by the repeated sorption with hydrogen as described above are available for various purposes. More particularly, they are suitable for use (1) as catalysts, (2) as carriers for catalysts, and (3) in jewelry or other arts where the new shapes of the pseudomorphic metal are specially attractive or valuable.

I claim:

1. The herein described process which consists in subjecting compact palladium having a clean surface to an activating treatment consisting of repeated hydrogen sorption at a temperature below 70° C. alternating with the discharge of the sorbed hydrogen by thermic action until by such repeated sorption and discharge of the hydrogen the metal is activated to such a state that the hydrogen-palladium compounds after the last sorption have become pyrophoric.

2. The herein described process which consists in subjecting compact palladium having a clean surface to an activating treatment consisting of repeated hydrogen sorption at a temperature below 70° C. alternating with the discharge of the sorbed hydrogen by thermic action until by such repeated sorption and discharge of the hydrogen the metal is activated to such a state that the hydrogen-palladium compounds after the last sorption have become pyrophoric and the metal surface has shrunk to such a degree that no substantial further shrinkage of the metal surface occurs when this process of repeated charging with hydrogen and discharging is continued.

3. A process according to claim 2 in which the compact palladium subjected to the process is preliminarily subdivided by mechanical working processes into individual metal bodies of relatively small size.

4. A process according to claim 2 in which the compact palladium subjected to the process is preliminarily subdivided mechanically into bodies which are fashioned approximately uniformly with respect to the three dimensions of space and in which the activation of the metal by the process of repeated sorption and discharge of hydrogen is continued until the individual palladium bodies have shrunk to the form of spheres.

5. A process according to claim 2 in which the compact palladium subjected to the process is mechanically subdivided into very small pieces.

6. A process according to claim 1 in which compact palladium of a shape in which one dimension predominates is subdivided into smaller pieces of suitable size which pieces are then further converted mechanically into blanks of reduced surface and are in this state subjected to the process of activation.

7. A process according to claim 1, in which small pieces of palladium foil are used as the starting material.

8. A process according to claim 1, in which the compact palladium metal, before it is subjected to the alternate charging and discharging with hydrogen, is mechanically reduced by at least 70%.

9. A process according to claim 1, in which the charging of the compact palladium metal is carried out with molecular hydrogen from the gas phase.

10. A process according to claim 1, in which the charging of the compact palladium metal with hydrogen is effected at temperatures not exceeding 25° C.

11. A process according to claim 1, in which the discharge of the hydrogen from the hydrogen-charged coherent metal pieces is effected by burning off the hydrogen.

12. A process according to claim 1, in which cooling is employed during sorption to carry off heat developed by such sorption.

13. The herein described process which consists in subjecting palladium in the state of the compact metal to a preliminary chemical treatment to transform the compact palladium metal into the chemically active state towards hydrogen and then subjecting such palladium to a further activating treatment consisting of repeated hydrogen sorption at a temperature below 70° C., in about the weight ratio corresponding to the compound $Pd_3H_2$, alternating with the discharge of the sorbed hydrogen by thermic action.

14. A process according to claim 1, in which palladium wire is used as a starting material, such wire being coiled into balls, and such balls of wire being then subjected to the activating treatment consisting of hydrogen sorption alternating with the discharge of the sorbed hydrogen.

JOHANN S. STREICHER.